United States Patent
Dobberpuhl et al.

(10) Patent No.: US 6,754,718 B1
(45) Date of Patent: Jun. 22, 2004

(54) PUSHING ATTRIBUTE INFORMATION TO STORAGE DEVICES FOR NETWORK TOPOLOGY ACCESS

(75) Inventors: Walter T. Dobberpuhl, Milford, MA (US); Andreas L. Bauer, Acton, MA (US); George M. Ericson, Shrewsbury, MA (US); Charles H. Hopkins, Upton, MA (US); Jennifer Lyn Milliken Nicoletti, Framingham, MA (US); Walter A. O'Brien, III, Westborough, MA (US); Timothy D. Sykes, Berlin, MA (US); Stephen James Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/568,386

(22) Filed: May 10, 2000

(51) Int. Cl.[7] ........................ G06F 15/16; G06F 15/167; G06F 12/00
(52) U.S. Cl. ........................ 709/250; 709/213; 709/227; 707/200
(58) Field of Search ................................ 709/213, 250, 709/227; 707/200

(56) References Cited

U.S. PATENT DOCUMENTS

| | | | | |
|---|---|---|---|---|
| 5,611,056 A | * | 3/1997 | Hotchkin | 710/306 |
| 6,148,414 A | * | 11/2000 | Brown et al. | 714/9 |
| 6,209,023 B1 | * | 3/2001 | Dimitroff et al. | 709/211 |
| 6,212,606 B1 | * | 4/2001 | Dimitroff | 711/147 |
| 6,289,333 B1 | * | 9/2001 | Jawahar et al. | 707/2 |
| 6,363,427 B1 | * | 3/2002 | Teibel et al. | 709/227 |
| 6,389,432 B1 | * | 5/2002 | Pothapragada et al. | 707/205 |
| 6,421,711 B1 | * | 7/2002 | Blumenau et al. | 709/213 |
| 6,430,645 B1 | * | 8/2002 | Basham | 710/305 |
| 6,470,397 B1 | * | 10/2002 | Shah et al. | 709/250 |
| 6,496,914 B1 | * | 12/2002 | Vook et al. | 711/170 |
| 6,564,228 B1 | * | 5/2003 | O'Connor | 707/200 |

* cited by examiner

*Primary Examiner*—Krisna Lim
(74) *Attorney, Agent, or Firm*—Bromberg & Sunstein LLP

(57) ABSTRACT

A method apparatus and computer program product for providing access to host attribute information in a storage area network is disclosed. The storage area network is composed of a plurality of hosts coupled to at least one initiator. Each initiator is coupled to one or more targets and each initiator has an associated identifier. In each host, the identifier of the initiator is related to other host attribute information. The identifier may be, for example, a world wide name. The host attribute information including the identifier is sent from each of the plurality of hosts to the one or more targets and stored in memory of an associated storage array. Either a host or requestor remote from the storage array may request the collected host attribute information from the storage array. A topology of the storage area network may then be formed from the host attribute information of each host.

4 Claims, 3 Drawing Sheets

PUSHING ATTRIBUTE INFORMATION TO STORAGE DEVICES FOR NETWORK TOPOLOGY ACCESS

TECHNICAL FIELD

This invention generally relates to storage area networks, and more particularly to providing access to host attribute information.

BACKGROUND ART

As businesses grow, so too do their requirements for the storage of data. Storage area networks (SANs) are a scalable solution to this problem, allowing additional storage devices to be added as the need arises. SANs contain storage devices and servers forming a network configuration. SANs provide a mechanism through which all of a business' storage devices may be made available to all of the servers in the business' computer network. The servers in a SAN are coupled to the computer network of the business and act as a pathway between the end user and the stored data. Because stored data does not reside directly on any of the SAN's servers or the servers of the computer network external from the SAN, server power is utilized for business applications, and network capacity is released to the end user. Since there is no central processing bottleneck and many storage devices may be connected to the SAN, the SAN is scalable.

One of the major challenges for the designers of SANs involves their configuration and management. Due to the ever growing number of components in a scalable SAN, the changing state of those components, and the multitude of physical and logical relationships between components, creating a topology of the SAN which a system manager can use possesses a difficult task. Prior art SANs do not have the ability to automatically create a current topology providing recognizable identifiers for the connected components. As such, system managers are forced to create associations between the world wide name of particular host bus adapters (HBAs) and the servers that are connected to them.

At best, in a SAN in which the components are connected through a fibre channel, the communication protocol of the fibre channel provides a means at the storage array for linking a world wide name (WWN) of a host bus adapter (HBA) to an identifier of the storage array, but the protocol does not provide any information about the server connected to the host bus adapter and therefore does not define a usable topology for the SAN.

SUMMARY OF THE INVENTION

A computer program product and method for providing access to host attributes in a storage area network is disclosed. A storage area network is composed of a plurality of hosts coupled to at least one initiator wherein the initiator is in turn coupled to one or more targets. Host attribute information may include the user selected name for the host, the Internet Protocol address for the host, the operating system of the host, the type of each initiator connected to the host, and an identifier of each initiator coupled to the host, such as a worldwide name. An example of a host is a server. An example of an initiator is a host bus adapter and an example of a target is a storage array.

In each host, the host polls for host attribute information. In one embodiment, the step of polling requires accessing all SCSI devices attached to the host and querying the operating system resident on the host. The host then relates the identifier, such as a world wide name of each coupled initiator to the other obtained host attribute information. The host attribute information is sent from each of the plurality of hosts to the one or more targets. Upon receipt of the host attribute information, each target stores the host attribute information in an addressable memory location. After the host attribute information is stored for all hosts, any host may access any of the targets and request the host attribute information resident on the target. In one embodiment the host attribute information on each target is identical. Based upon the host attribute information retrieved from the addressable memory location, the retrieving host creates a topology of the storage area network.

In another embodiment, a user remotely accesses a host which is part of the storage area network. The user may access either the topology created by the host or initiate the retrieval from a database on the target all of the host attribute information in order to create a topology for issuing further commands any of the components of the storage area network. In one embodiment, the host attribute information are retrieved from one of a plurality of storage arrays. In such an embodiment, each storage array is composed of disks grouped into LUNs and the database includes an association of LUN information and host attribute information. The association between the LUN information and the host attribute information is then used in the creation of the topology. The topology may then be displayed to the remotely connected user.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

For the purposes of the description herein and the claims that follow it, unless the context otherwise requires, the term "Storage Area Network" (SAN) is a network of shared storage devices in which each storage device includes a processor for communicating through a communications protocol with other devices connected to the SAN, such as a server, or devices external to the SAN. A storage device is a machine that contains a disk or disks for storing data. The term storage device and storage array shall be used interchangeably herein. In the preferred embodiment the communications protocol is SCSI (small computer system interface). SCSI provides for the control of the input and output of connected devices over a data bus. In the following detailed description and appended claims the term "data bus" shall refer to any connection between an initiator and a target which transports communication commands. In the preferred embodiment, the storage area network employs fiber optic cable as a data bus for connections between initiators and targets. In other embodiments the data bus may be a 16-bit standard SCSI cable. In the following detailed description and the appended claims, the term "host attributes" shall mean any indicia of the server, such as, the name of the server, the Internet Protocol (IP) address of the server, or the operating system of the server. Host attributes also include indicia identifying components linked to the server, such as, host bus adapters and include an identifier of such host bus adapters such as the world wide name (WWN) and the type of each adapter. In the following detailed description and appended claims, the terms server and host shall be used interchangeably to denote a computer or processor with coupled memory which is part of a storage area network unless indicated otherwise. In the following detailed description and the appended claims the term "topology" shall mean a mapping of all devices within a network, such as, a storage area network, and the interconnections between the devices. The term "memory location" as used in the written description and the appended claims shall mean one or more addressable areas for the storage of data.

Figure 1:
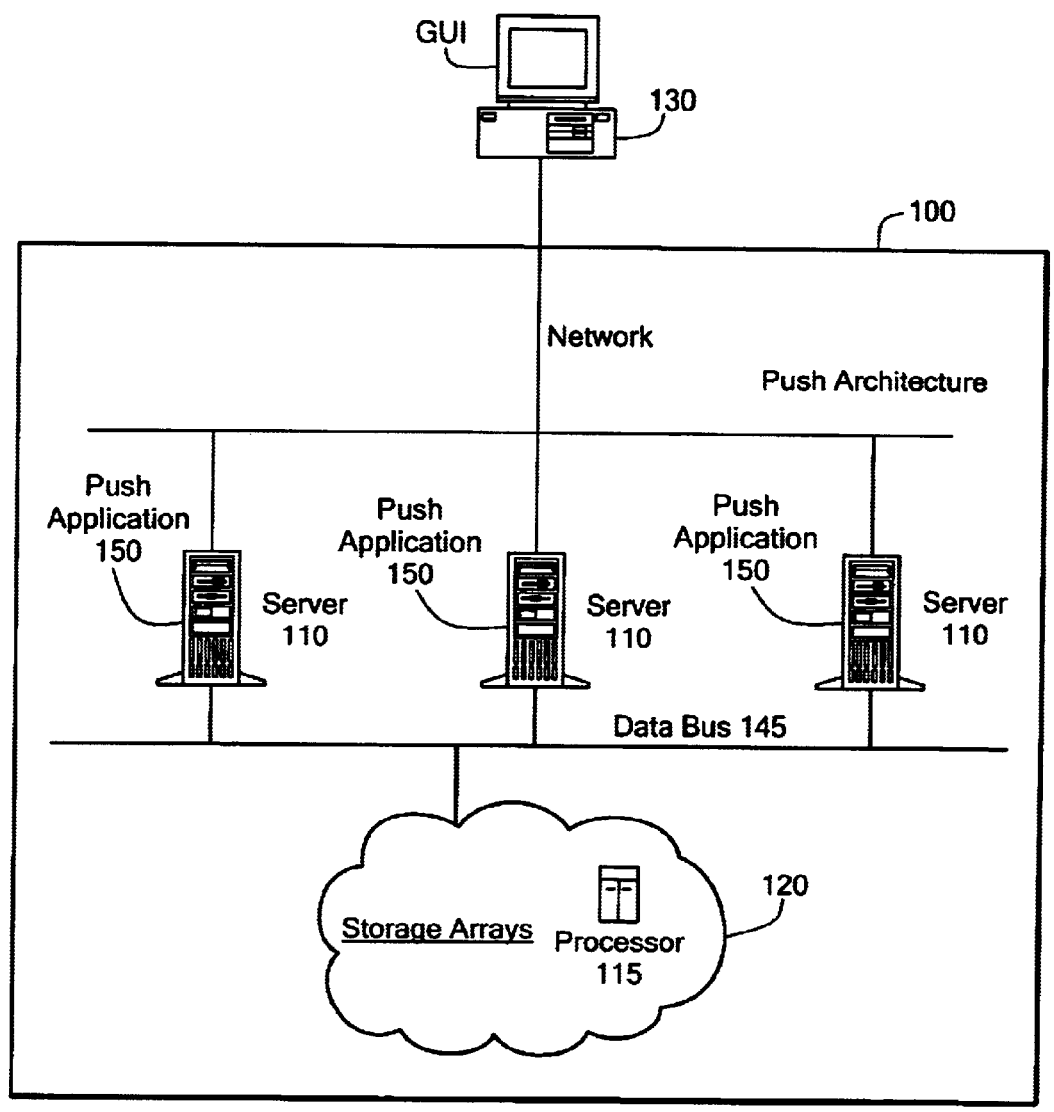
FIG. 1 is a representation of a storage area network in which host attribute information is provided to the storage arrays.

FIG. 1 is a representation of a storage area network 100 in which host attribute information is provided to storage devices for the formation of a SAN topology. The storage area network includes a plurality of servers 110 and at least one coupled storage array 120 containing a processor 115. Each storage array 120 and server 110 is capable of communicating with other storage arrays and servers through a communication protocol on a data bus 145. Communication is also possible with devices outside of the SAN. For example, a computer 130 connected to the network either locally or remotely may access the servers of the SAN through an address associated with the server such as an Internet protocol address.

In a SAN environment, one embodiment of this method allows a server coupled to a storage array to determine all of the servers coupled to that storage array by querying the storage array only. The server can determine the attributes of all coupled servers as well as the attributes of all the HBAs within the coupled servers and the mappings of the HBA's to the storage pools(user data) by retrieving this data from the storage array. This is more efficient than connecting to each server individually and allows a storage area network topology of coupled servers to be constructed by the storage array or any coupled server and enables a graphic user interface (GUI) to represent the topology that does not require user knowledge HBA and Storage Processor World Wide Names.

Through an application, known as an push application 150, residing on a coupled server, computer 130 may access data from a storage array and manage and configure the SAN. In one embodiment, a connected computer resides in a local area network (LAN) or wide area network (WAN) which is connected to the SAN. In another embodiment, a computer remotely connects to a server within the SAN by accessing the server's IP address through an Internet connection.

In an embodiment of the invention, the push application 150 residing on each of the servers 110 in the SAN 100 polls all connections to its respective server to obtain host attributes and causes host attribute information to be "pushed" down from the server to the storage arrays. In the preferred embodiment, the host attribute information includes at least the server name and server IP address, connected host bus adapter (HBA) port numbers and HBA type (OS Platform) and associated identifier, such as a WWN and the operating system device name of the HBA path. This information is stored by the push application in a memory location associated with the storage array. Preferably the host attribute information is stored as a collection of structured data and may be stored within a database structure. The host attribute information for each host is sent and stored at each attached storage array. After each of the servers 110 within the SAN 100 have sent their host attribute information to the storage array 120, the collected host attribute information allows a processor resident in the storage array or a push application 150 connected within the SAN or a remote GUI 130 connected to a push application 150 connected to a SAN to form a network topology.

Figure 2:
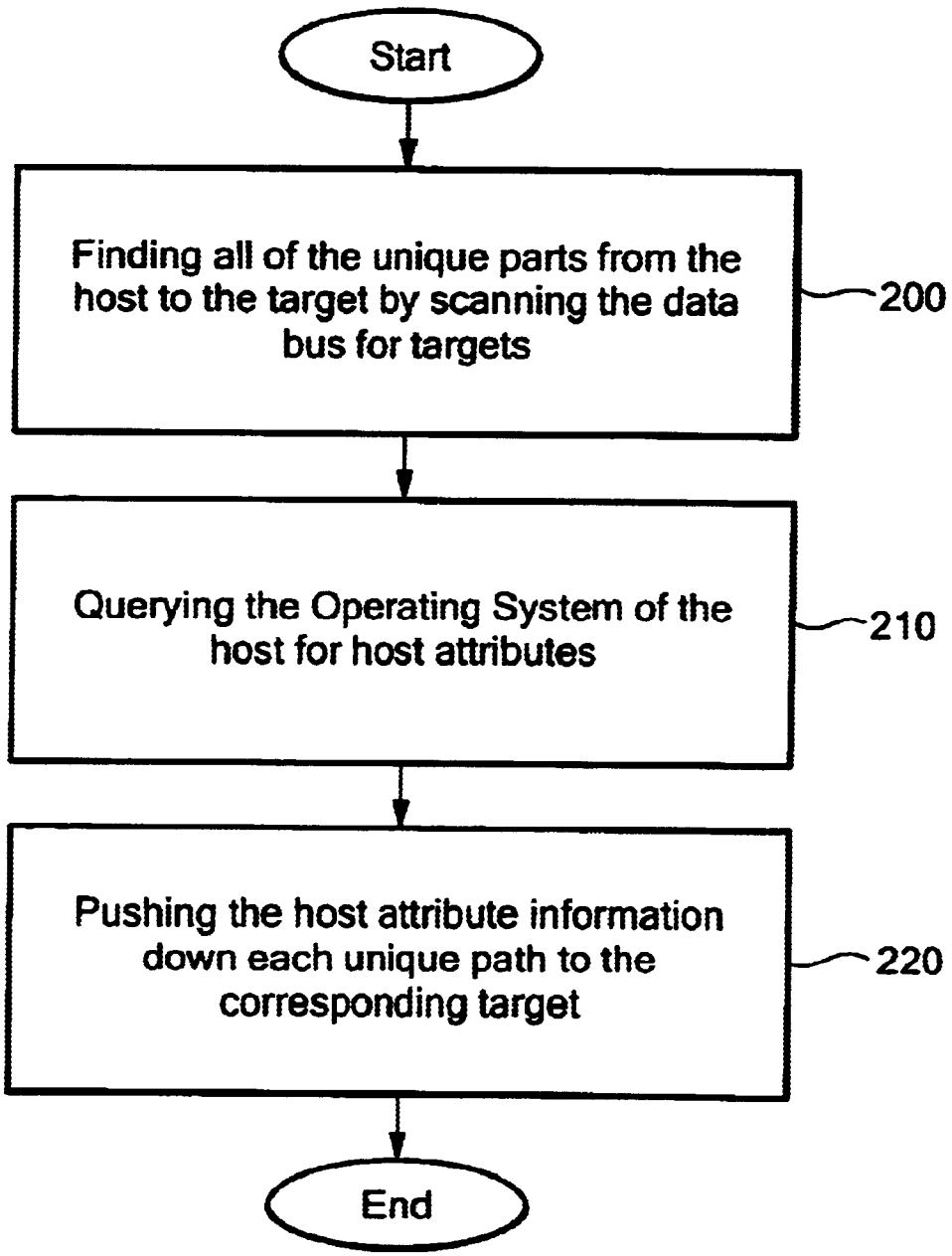
FIG. 2 is a flow chart showing the pushing of host attribute information.

FIG. 2 is a flow chart of the steps taken by a server in the course of pushing host attribute information to a target. The push application resident on the server begins by finding all of the unique paths from the server to the storage array(s), this is done by scanning the data bus for the storage array(s) (step 200). In the preferred embodiment, the data bus is a SCSI bus known as a fibre channel. A unique path is comprised of a coupling between an initiator and a target. An example of an initiator is a HBA and an example of a target is a storage processor of a storage array. For instance, if there are two HBAs and two storage processors connected to the host, then there are a total of 4 unique paths: (HBA1, SP1), (HBA1, SP2), (HBA2, SP1), (HBA2, SP2).

The push application then determines the host attributes by querying the operating system of the server (step 210). The push application obtains the host name, host IP address, and the HBA type. In the preferred embodiment the HBA type is determined solely by the operating system used on the server. Each operating system including but not limited to the Microsoft Corporation's Windows NT or Sun Microsystem's Solaris use a particular and unique HBA type. The push application also obtains the operating system device name for the HBA path. An example of this server attribute for Windows NT would be \\.\SCSI3:0:2:0. The push application will then determine further host attributes for the HBA from the operating system. The HBA attributes include the HBA Vendor Name, the HBA Model and the HBA device driver description.

The push application will first query the target to determine if the target is running a compliant topology program for receiving host attribute information. This prevents other SCSI devices which are either not capable of being upgraded to the topology program or have not been upgraded from receiving unintelligible data. If the target is capable of receiving host attribute information, the push application then pushes the host attribute information down each unique path to the corresponding target (step 220). The Storage Processor(s) will receive the pushed information and store it in a database, along with the WWN of the HBA (which is determined by the underlying communication protocol). In the preferred embodiment the fibre channel protocol determines the WWN of the HBA. It should be understood that for each storage array there is a separate database. It should also be understood that the WWN after it is associated with the other host attribute information will also be considered host attribute information. As previously stated, the host attribute information is preferably stored in database, but may also be stored in any addressable memory.

Figure 3:
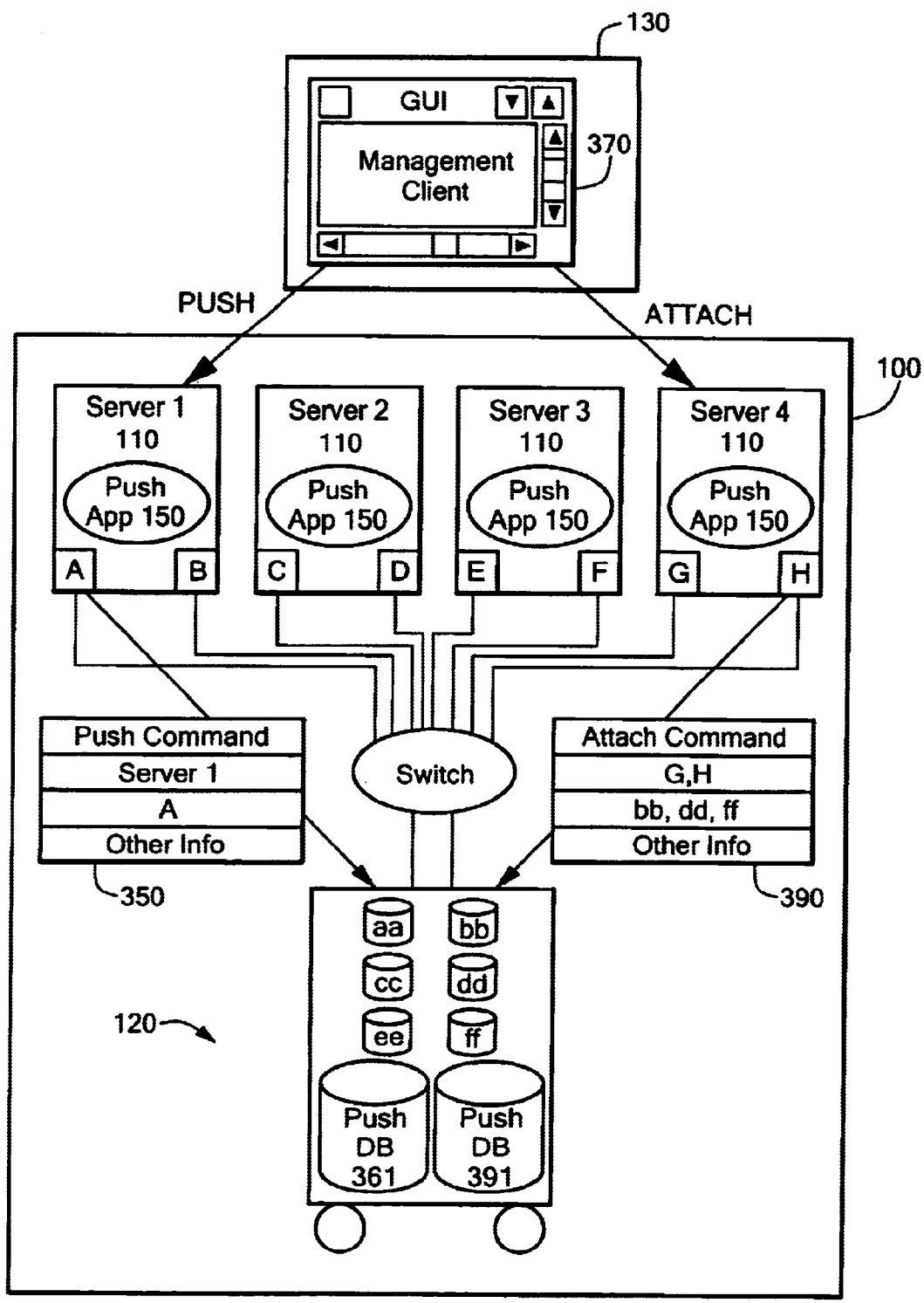
FIG. 3 is a detailed example of a storage area network.

FIG. 3 is a detailed example of storage area network shown in FIG. 1 in which host attribute information is pushed to a storage array. It should be understood that although this example shows only one storage array, multiple storage arrays may be part of the SAN. After each server 110 (server 1–4) of the SAN is booted, a push application 150 begins to automatically execute. A vendor unique SCSI command known as a push command 350 is created which sends the host attributes to the storage array 120 as described above. The push command can also be initiated by a system manager through an external application referred hereinafter as the "management client" 370, on a computer 130 which is coupled to the SAN 100. Through a GUI 370, the system manager can execute a push in order to update the database to obtain a topology of the SAN that contains all of the current connections. The push command 350 creates a data structure which contains the name of the server which in the example is server 1, the identifier of the host bus adapter or world wide name of the host bus adapter which is A and the push application sends the push command to a push database 361 on the storage array. The data structure of the push command may contain other host attributes. The push application then requests the database 361 from the storage array 120 and creates a displayable map or list of host HBAs' and storage arrays. The push database 361 includes the host attributes of all of the servers connected to the SAN which in this example would be the host attributes for servers 1, 2, 3, and 4. The data contained in the push database 361 provides a description of the topology of the SAN 100 and the push application 150 creates a displayable map from the database 361. When a system manager accesses any of the servers in the SAN 100, the push application can send a current topology of the SAN 100 to a graphical user interface(GUI) 370 of the system manager's computer. The topology is such that a system manager need not associate a World Wide Name of a HBA with a server, rather the system manager is presented with a topology showing the name of the server along with other host attributes and which shows the host bus adapters connected to the server and all of the possible data paths. This allows a much more intuitive interface for SAN configuration to be presented to the system manager. The system manager may then configure the SAN by grouping disks in the disk array together. In FIG. 3 there are six groupings of disks aa,bb,cc,dd,ee,ff into LUNs. Once the LUNs are established, the LUNs become an element of the topology which the system manager may manage and configure. It should be understood by one of ordinary skill in the art that the program which creates the topology or list of servers, host bus adapter connections and connected storage arrays in the storage area network may be resident at the server, at the storage array, or at the remote location of the system manager's computer. Database 361 may simply be addressable memory associated with the storage array in an alternative embodiment.

The push application 150 of each server (server 1–4) periodically polls the database or addressable memory 361 for changes and also periodically sends the server's attributes to the storage processor of every storage array (in FIG. 3 only one storage array 120 is shown) which has a data path to the server. By periodically updating the database 361, the current state of the SAN 100 is maintained. In an alternative embodiment, the system manager or other user of the invention may request the topology directly from the storage processor associated with the storage array 120. In such an embodiment, the storage processor of the storage array 120 includes a program which accesses the database 361 which is stored in a memory location in the storage array 120 and the program creates a displayable topology based upon the associations of the data in the database 361.

FIG. 3 also shows a second command being sent to the storage array. The second command is an attach command 390 which is used in configuration of the SAN 100. The attach command 390 is also a vendor unique SCSI command which identifies the available data paths which are accessible and visible to a user connecting to the SAN 100. Once the push application 150 has created the topology of the SAN 100 and the system manager has accessed the topology, the system manager can issue an attach command 390. The attach command 390 determines the visible paths that a user of the SAN can see. The attach command 390 creates a data structure which includes the name or worldwide name of the host bus adapter attached to a given server along with the disks or groups of disks in the storage array 120 selected by the system manager to be visible to a user who is connected to that server. The attach command pushes the information into an attach database 391 in the storage array 120. When a user through a computer attempts to access information in the SAN 100, the user connects either remotely or locally to a server in the SAN through standard communication protocols known to those of ordinary skill in the art. Upon connecting, the server through an attached initiator issues a retrieve vendor unique SCSI command which contains indicia of source to the storage processor. The retrieve vendor unique SCSI command requests data associated with the connected server from the attach database. The storage processor in response to the retrieve vendor unique SCSI command collects and transmits to the server the requested data. The server then uses the data to create a topology of the SAN which is visible to the user and then the topology is transmitted to the computer associated with the user. For example, in FIG. 3 the attach command 390 indicates that a user who logs into server four can access either HBA G or HBA H and can virtually see logical unit numbers (LUNs) bb, dd, ff, although LUNs aa, bb, cc, dd, ee, and ff physically exist. As a result, a retrieve vendor unique SCSI command is issued and a topology containing HBA G and HBA H and LUNs bb dd and ff is transmitted to the user's associated computer. By using the attach command a system administrator may limit access to certain data locations within the storage array thus providing security.

In an alternative embodiment, the attach command contains indicia of user identity. Thus, a unique topology for the specific user may be created in the following manner. When the user connects to a server in a SAN data concerning the identity of the user may be transmitted to the server. The server then incorporates the identity of the user into the retrieve vendor unique SCSI command and data is retrieved from the attach database which provides a unique topology for the specific user. For instance, a particular business employee may be granted access to all of the LUNs and the employee will be provided with a topology reflecting this unlimited access while an unknown party accessing the SAN through the Internet may be granted access to a limited number of the LUNs and like the topology for the business employee the topology provided for the unknown party will reflect the access privileges provided by the system administrator.

For more information about the methodology for controlling access to data locations see U.S. patent application Ser. No. 09/014,064 entitled "Apparatus and Method of Accessing Target Devices Across a Bus Utilizing Initiator Identifiers" assigned to the same assignee as the present application and incorporated herein in its entirety.

In an alternative embodiment, the disclosed method for attribute information access may be implemented as a computer program product for use a computer system as described above. Such an implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for providing access to host attribute information in a storage area network wherein the storage area network is composed of a plurality of hosts coupled to at least one initiator, each initiator coupled to one or more targets and each initiator having an associated worldwide name, the method comprising:

in each host, relating the worldwide name of the initiator to other host attribute information; and sending the host attribute information including the worldwide name from each of the plurality of hosts to the one or more targets;

storing the host attribute information for each host including the associated world wide name in a memory location in a storage array coupled to the target;

from a remote location relative to the storage area network, requesting from a host a topology of the storage area network;

retrieving at a host, host attribute information from the storage array;

creating a topology based on the host attribute information retrieved from the storage array; and sending the topology to the remote location.

2. A method for providing access to host attribute information in a storage area network wherein the storage area network is composed of a plurality of hosts coupled to at least one initiator, each initiator coupled to one or more targets and each initiator having an associated worldwide name, the method comprising:

in each host, relating the worldwide name of the initiator to other host attribute information; and sending the host attribute information including the worldwide name from each of the plurality of hosts to the one or more targets;

storing the host attribute information for each host including the associated world wide name in a memory location in a storage array coupled to the target;

remote from the storage area network, retrieving the host attribute information from the storage array;

creating a topology of the storage area network based on the host attribute information retrieved from the storage array; and displaying the topology of the storage area network.

3. A method for providing access to host attribute information in a storage area network wherein the storage area network is composed of a plurality of hosts coupled to at least one initiator, each initiator coupled to one or more targets and each initiator having an associated worldwide name, the method comprising:

in each host, relating the worldwide name of the initiator to other host attribute information; and sending the host attribute information including the worldwide name from each of the plurality of hosts to the one or more targets;

storing the host attribute information for each host including the associated world wide name in a memory location in a storage array coupled to the target;

from a remote location remote from the storage area network, retrieving host attribute information from the storage array;

in a processor associated with the storage array creating a topology of the storage area network based on the host attribute information;

sending the topology to the remote location; and displaying the topology of the storage area network.

4. A computer program product operative on a computer for providing access to host attribute information in a storage area network wherein the storage area network is composed of a plurality of hosts coupled to at least one initiator, each initiator coupled to one or more storage arrays and each initiator having an associated identifier, the computer program product comprising:

computer code, in each host, for relating the identifier of the initiator to the other host attribute information; and computer code for sending the host attribute information from each of the plurality of hosts to the one or more storage arrays;

computer code for retrieving host attribute information from the storage array in response to a remote request from a remote processor; and computer code for creating a topology of the storage area network; and computer code for sending the topology to the remote processor.

* * * * *